United States Patent [19]
Walden

[11] Patent Number: 4,570,906
[45] Date of Patent: Feb. 18, 1986

[54] SLAT ASSEMBLY FOR CHAIN LINK FENCE
[75] Inventor: Fred O. Walden, Eatonville, Wash.
[73] Assignee: Pacific Fence & Wire Co., Clackamas, Oreg.
[21] Appl. No.: 631,481
[22] Filed: Jul. 16, 1984
[51] Int. Cl.⁴ .................. B21F 27/00; E04H 17/02
[52] U.S. Cl. ........................................ 256/34; 256/35; 245/; 403/234
[58] Field of Search ............... 256/34, 35; 403/234, 403/237; 245/11

[56] References Cited
U.S. PATENT DOCUMENTS

| | | | |
|---|---|---|---|
| 2,760,759 | 8/1956 | Rice | 256/34 |
| 3,712,590 | 1/1973 | Tochner et al. | 256/34 |
| 3,851,981 | 12/1974 | Corsi et al. | 403/237 |
| 4,085,954 | 4/1978 | Thompson | 256/34 |
| 4,355,919 | 10/1982 | Lievonen | 403/234 X |

Primary Examiner—Andrew V. Kundrat
Attorney, Agent, or Firm—Kolisch, Hartwell & Dickinson

[57] ABSTRACT

An assembly of slat members for insertion in a chain link fence includes a plurality of elongate, first slat members having opposed, substantially planar faces predimensioned to be interwoven between vertically consecutive links of the fence, each first slat member having one end formed with edges and a pair of resilient, spaced-apart flange members. The assembly also includes a second slat member having opposed, substantially planar faces predimensioned to be interwoven between horizontally consecutive, lower links of the fence for presenting an edge facing upwardly. The first slat members are downwardly positionable through the vertically consecutive links to a position whereby the bottom edge of each first slat member abuts or seats upon the upwardly facing edge of the second slat member, with the flange members overlapping opposite faces of the second slat member.

4 Claims, 7 Drawing Figures

SLAT ASSEMBLY FOR CHAIN LINK FENCE

BACKGROUND AND SUMMARY OF THE INVENTION

The present invention relates to chain link fence, and more particularly to a novel construction and assembly of slat members which are predimensioned to be insertably interwoven between links of the fence to provide a decorative effect and enhance privacy.

It is known to insert slat members in spaced-apart parallel rows through vertically consecutive links of a chain link fence. Such as construction, utilizing wooden slat members or inserts is disclosed in Rice, U.S. Pat. No. 2,760,759. The vertically positioned slat members shown in the patent have their bottom edges positioned for abutting against a horizontally disposed slat member. The horizontally disposed slat member is interwoven between horizontally consecutive lower links of the fence. In addition, it is disclosed in that patent that slat members may be positioned in parallel, diagonal rows, with their lower ends suitably cut at an angle to be positioned against the lower horizontal slat member. However, it should be recognized that wooden slat members may deteriorate over time because of exposure to the elements and inclement weather. While painting of the slat members could forestall that problem somewhat, time-consuming removal of the slat members is necessary for subsequent painting in order to prevent inadvertent painting of the chain link fence proper.

A proposal for using elongate slats formed of substantially flattened tubular material, such as a thermoplastic resin is set forth in Thompson, U.S. Pat. No. 4,085,954. In that patent a plurality of elongate slat members are disclosed as being woven through the links of a chain link fence, in spaced parallel arrangement, and are engaged at one set of their ends - the lower ends for example - within an elongate channel-shaped retainer member. The retainer member is woven through the links, as at the bottom of the fence, at an angle to the parallel slats.

It can be seen that the construction set forth in U.S. Pat. No. 4,085,954 is disadvantageous because the retainer member must be specially pre-formed with the channel-shaped or U-shape configuration. In addition, because the retainer member is configured differently from the slats which are to be spaced in parallel arrangement, care must be taken during assembly that the various components do not become inadvertently substituted for one another. Moreover, it should be recognized that a chain link fence may extend for considerable stretches, as around large residences, buildings, storage yards, fields, etc. It is necessary in those circumstances to have the retainer members formed as separate units of a length to facilitate handling for installation in the field by feeding them through the horizontally consecutive links adjacent the bottom of the fence. With separate lengths of retainer members, it is desirable to fit them together, however, U.S. Pat. No. 4,085,954 discloses no ready means for effecting interlock.

The above disadvantages of the prior art have been overcome by applicant's novel slat assembly for arrangement in chain link fence. Specifically, it is a general object of the present invention to provide an arrangement of slat members in which a plurality of elongate, first slat members having opposed, substantially parallel faces predimensioned to be interwoven between vertically consecutive links of the fence. The first slat members are formed with bottom edges and a pair of resilient, spaced-apart flange members. A second slat member or members are interwoven between horizontally consecutive, lower links of the fence to present an edge facing upwardly. The bottom edge of each first slat member is then positioned to "seat" upon the upwardly facing edge of the second slat member, so that the flange members overlap opposite faces of the second slat member.

It is another object of the present invention to form each slat member substantially identically, i.e., all the first and second slat members will have one end formed with a pair of resilient, spaced-apart flange members. With respect to the horizontally positioned or second slat members, the flange members of one may be inserted or overlapped around the nonflanged end of an adjacent horizontally positioned slat member to provide an interlocked fit.

These and other advantages of the present invention will be more readily understood from a consideration of the drawings and the detailed description of the preferred embodiment.

DETAILED DESCRIPTION OF THE PREFERRED EMBODIMENT

Figure 1:
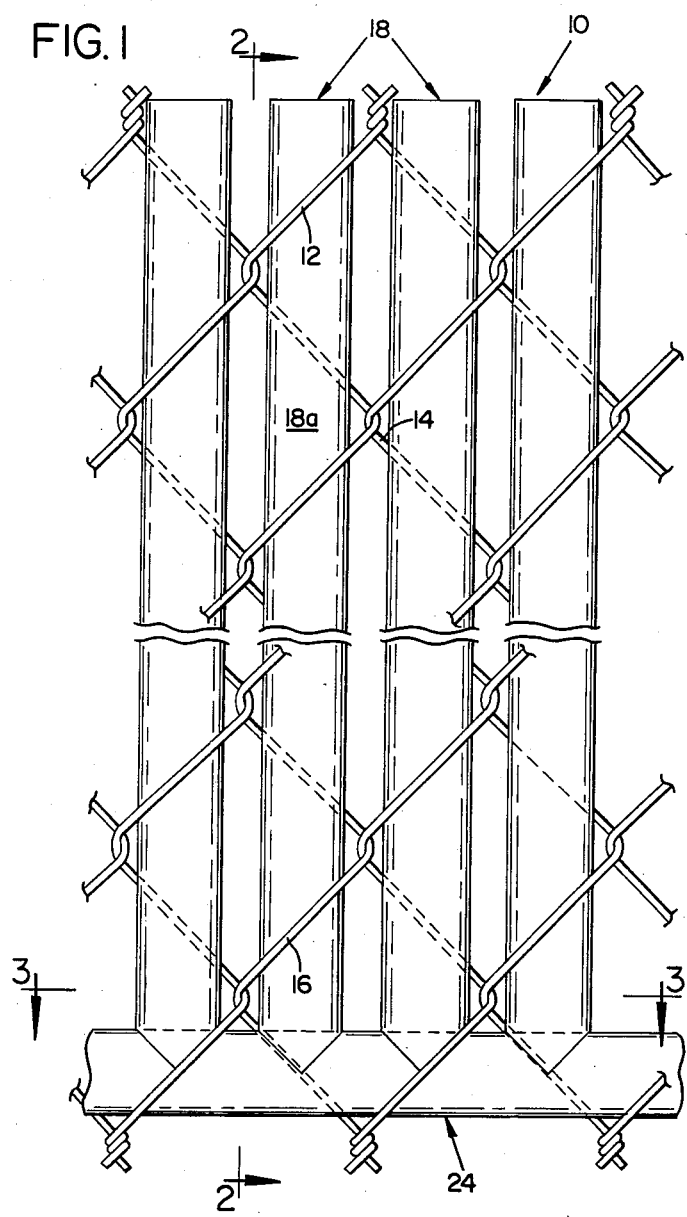
FIG. 1 is a side elevational view of a portion of a chain link fence, broken along its height, illustrating interwoven first and second slat members in accordance with the present invention.

As mentioned at the outset, the present invention is directed to a novel slat assembly in which first slat members are predimensioned for being insertably interwoven between vertically consecutive links of the fence for mounting or seating upon a second slat member predimensioned to be interwoven between horizontally consecutive, lower links of the fence. The general arrangement of the slat assembly, as it is mounted in a chain link fence, is illustrated in FIG. 1. Specifically, a portion of a chain link fence, cut along its height, is generally indicated at 10. The chain link fence is of conventional construction, i.e., it includes a plurality of elongate wires which course in a patterned sequence of relatively short, sharp angles to form a series of diamond-shaped links, such as indicated at 12, 14, 16, etc. The links define vertically parallel and consecutive rows, and also define parallel horizontally consecutive rows.

Figure 2:
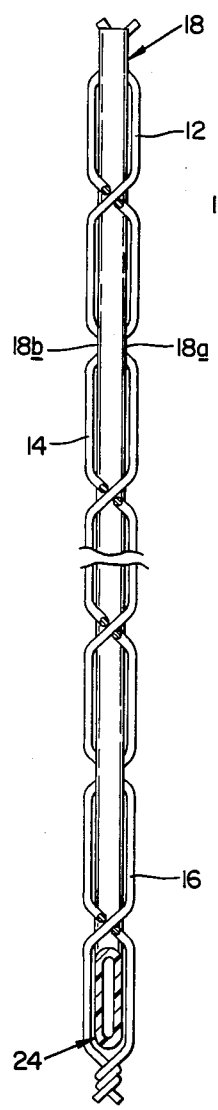
FIG. 2 is a view taken along lines 2—2 of FIG. 1.
Figure 4:
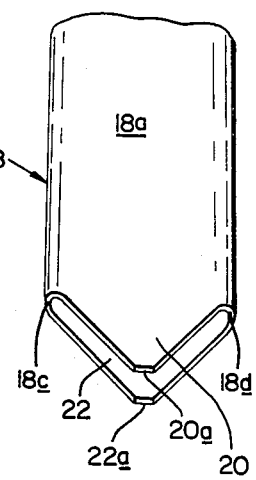
FIG. 4 is an enlarged view of a slat member, showing one end thereof formed with the flange members in accordance with the present invention.
Figure 3:
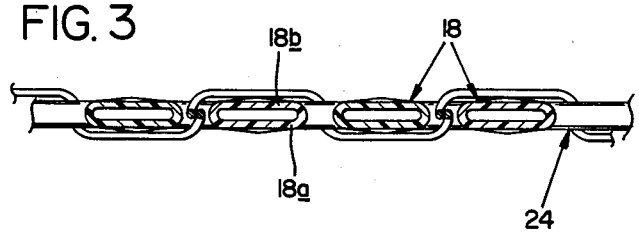
FIG. 3 is a cross-sectional view taken along lines 3—3 of FIG. 1.

The slat assembly of the present invention is defined by slat members which are basically identical in overall construction, the only difference being that some of the slat members may, depending upon a particular chain link fence, have different lengths. Specifically, as shown in FIG. 1, there is provided a plurality of elongate first slat members, indicated at 18, predimensioned to be interwoven between vertically consecutive links of the fence in parallel rows as shown in FIG. 1. Each first slat member 18 is formed with opposed, substantially planar faces such as indicated at 18a, 18b in FIGS. 2 and 3. Moreover, each first slat member is preferably formed as a hollow, substantially flattened tubular member of synthetic material, and as shown in FIG. 4, has one end - corresponding to the lower or bottom end - formed with bottom edges 18c, and 18d. Most importantly, first slat members 18 are provided with a pair of resilient, spaced-apart extensions such as projecting flange members 20, 22, which taper inwardly widthwise as also shown in FIG. 4.

Flange members 20, 22 are generally triangular-shaped from their extension from bottom edges 18c, 18d to define projecting "points," and may have slightly flattened apexes such as indicated at 20a, 22a. The top edges of first slat members 18 are rectilinear or flat as shown in FIG. 1, and are generally perpendicular to the longitudinal axis of each first slat member, although the top edges could be made in any desired configuration. It is the flange members which extend from the bottom of each first slat member which forms an important aspect of the present invention. That aspect will be discussed after a brief consideration of the construction of the second slat members, which are mounted adjacent a bottom of fence 10 for supporting the first slat members.

Figure 7:
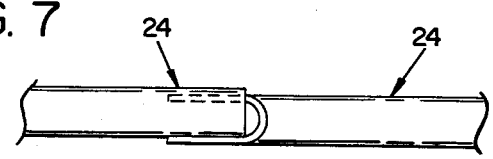
FIG. 7 is a view illustrating interlocking of a pair of the second slat members.
Figure 5:
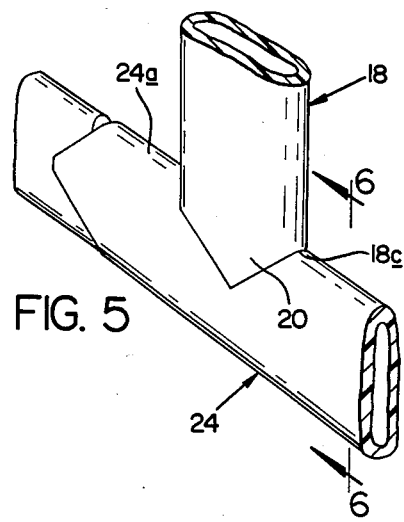
FIG. 5 is a perspective view showing seating of the first and second slat members.

Specifically, the bottom or second slat members, such as indicated at 24, are formed substantially identical to first slat members 18. Each second slat member includes an end, formed with generally triangular-shaped flange member, for enabling interconnection or interlocking of tandem ones of the second slat members when they are interwoven between horizontally consecutive, lower links of the fence such as shown in FIG. 1. The interlocking arrangement is best illustrated in FIGS. 5 and 7, with the chain link fence being removed for purposes of clarity. It is seen that the right-hand second slat member has one of its flange members inserted into the hollow portion of an adjacent second slat member. Alternatively, the flange members could be positioned on opposite sides of the second slat member in a manner similar to how the first slat members are seated upon the second slat members as shown in FIG. 1.

Figure 6:
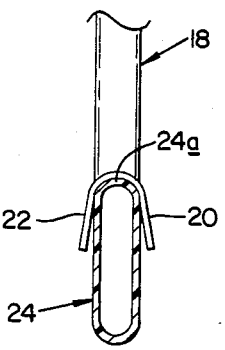
FIG. 6 is a cross-sectional view taken along lines 6—6 of FIG. 5.

An important aspect of the present invention resides in the manner in which first slat members 18 are seated upon second slat members 24. Specifically, the first slat members are interwoven between vertically consecutive links (second slat members 24 already having been interwoven between horizontally consecutive, lower links) until flange members 20, 22 splay slightly outwardly so as to overlap opposite faces of the second slat members as shown in FIG. 6. With first slat members 18 extended downwardly as far as possible, as shown in FIGS. 5 and 6, it will be seen that flange members 20, 22 overlap portions of the opposite faces of second slat member 24 so that bottom edges 18c, 18d of the first slat members engage or abut for firm "seating" against upper edge 24a of second slat member 24. A firmly held intersection results, with further downward movement of the first slat members being restrained and lateral movement of the first slat members, relative to the second slat members, being substantially eliminated because of the overlapping orientation of flange members 20, 22. A tight integral unit of a plurality of first slat members 18 and second slat members 24 results.

Another advantage of the present invention resides in the relative ease in which the flange members may be formed in the first and second slat members. For example, it is only necessary to cut an end of a slat by any convenient known means to form the angularity required. Another advantage of the flange members resides in their facilitating threading or interweaving of the slat members through the links. Explaining further, because the flange members are resilient, they tend to "give" as a slat member, such as first slat member 18, is threaded downwardly between links. Obviously, if a rectilinear end is provided, it can become impeded on a link during the threading sequence, and increases the time of assembly. In contrast, the flexibility of the resilient flange members enables rapid insertion of the slats.

While the present invention has been shown and described with reference to the foregoing preferred embodiment, it will be understood by those skilled in the art that other changes in form and detail may be made therein without departing from the spirit.

It is claimed and desired to secure by Letters Patent:

1. An assembly of slat members insertable in chain link fence comprising:
    a plurality of elongate, first slat members having opposed, substantially planar faces predimensioned to be interwoven between vertically consecutive links of the fence, each first slat member having a lower end formed with bottom edges from which extend a pair of substantially planar and resilient, spaced-apart flange members which taper inwardly widthwise; and
    an elongate second slat member, having opposed, substantially planar faces predimensioned to be interwoven between horizontally consecutive, lower links of the fence for presenting an upwardly facing edge so that when the first slat members are disposed toward and positioned against the second slat member at any location along its upwardly facing edge, the bottom edges of the first slat members will seat upon the upwardly facing edge of the second slat member so that the flange members overlap opposite faces of the second slat member.

2. The slat assembly of claim 1 wherein the second slat member is formed with an end thereof having flange members for engaging an adjacent, substantially identical second slat member.

3. The slat assembly of claim 1 wherein the flange members are defined by generally triangular-shaped projections extending from the bottom edge of the first slat members.

4. The slat assembly of claim 3 wherein the flange members are configured with flattened end portions.

* * * * *